US009009455B2

(12) United States Patent  
Lou et al.

(10) Patent No.: US 9,009,455 B2
(45) Date of Patent: Apr. 14, 2015

(54) BOOTING FROM A SECONDARY STORAGE DEVICE IN ORDER TO ACCUMULATE DISK DRIVE PERFORMANCE DATA

(75) Inventors: Mingji Lou, Corona, CA (US); Alain Chahwan, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 954 days.

(21) Appl. No.: 13/099,865

(22) Filed: May 3, 2011

(65) Prior Publication Data

US 2012/0284493 A1 Nov. 8, 2012

(51) Int. Cl.
*G06F 9/00* (2006.01)
*G06F 9/24* (2006.01)
*G06F 15/177* (2006.01)
*G11B 19/04* (2006.01)

(52) U.S. Cl.
CPC .................................. *G11B 19/048* (2013.01)

(58) Field of Classification Search
None
See application file for complete search history.

(56) References Cited

U.S. PATENT DOCUMENTS

| 5,909,661 | A | 6/1999 | Abramovitch et al. |
| 6,522,495 | B1 | 2/2003 | Lamberts et al. |
| 7,072,274 | B2 | 7/2006 | Smith et al. |
| 7,373,492 | B2 * | 5/2008 | Brandenberger et al. ......... 713/1 |
| 7,515,373 | B1 | 4/2009 | Supino |
| 7,576,940 | B2 | 8/2009 | Lee et al. |
| 2003/0220751 | A1 | 11/2003 | Toh et al. |
| 2009/0027846 | A1 * | 1/2009 | Armendariz et al. ......... 361/685 |
| 2012/0284493 | A1 * | 11/2012 | Lou et al. ......................... 713/2 |

OTHER PUBLICATIONS

M. Raghunath, C. Narayanaswami, C. Carter, R. Caceres, "Reincarnating PCs with Portable SoulPads", IBM Research Report, Nov. 8, 2004.

* cited by examiner

*Primary Examiner* — Tanh Nguyen

(57) ABSTRACT

A computer system is disclosed comprising a disk drive comprising a head stack assembly (HSA), the HSA comprising a spindle motor for rotating at least one disk, and at least one head actuated over the disk. The computer system further comprises a host coupled to the disk drive, wherein the host comprises a microprocessor operable to first boot the host by reading boot data from a secondary storage device. After first booting the host, the microprocessor commands the disk drive to accumulate performance data for the HSA, and after accumulating the performance data, the microprocessor second boots the host by reading boot data from the HSA.

22 Claims, 3 Drawing Sheets

FIG. 1C

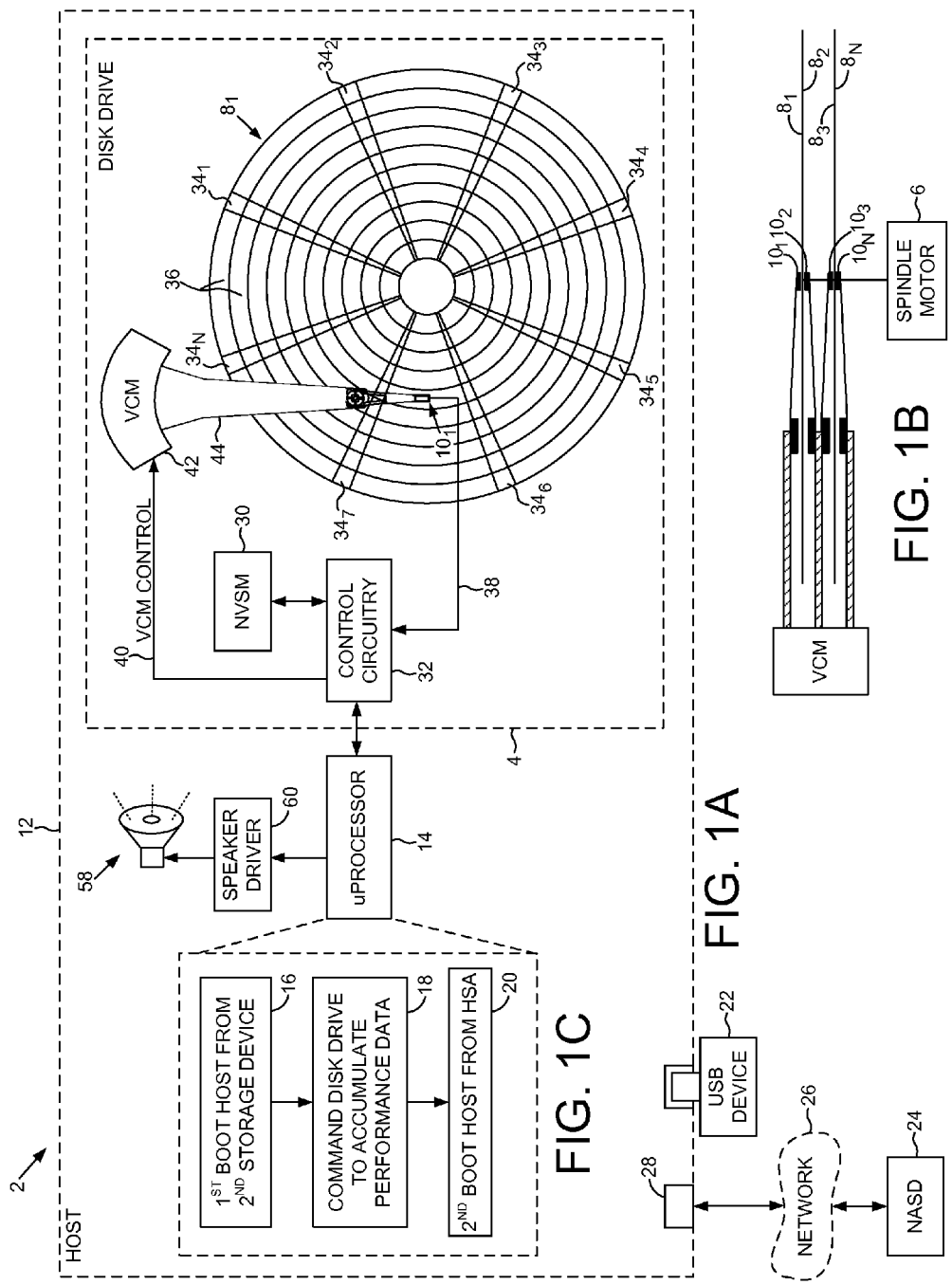

BOOTING FROM A SECONDARY STORAGE DEVICE IN ORDER TO ACCUMULATE DISK DRIVE PERFORMANCE DATA

BACKGROUND

Disk drives are employed in numerous areas such as computer systems (e.g., desktops, laptops, portables, servers, network attached storage, etc.) and consumer devices (e.g., music players, digital video recorders, etc.). A disk drive comprises a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track, as well as maintain the head over a target track during write/read operations.

BRIEF DESCRIPTION OF THE DRAWINGS

FIG. 1A shows a computer system according to an embodiment of the present invention comprising a host coupled to a disk drive.

FIG. 1B shows a disk drive according to an embodiment of the present invention comprising two disks having heads actuated over top and bottom surfaces, wherein the disks are rotated by a spindle motor.

FIG. 1C is a flow diagram according to an embodiment of the present invention wherein the host first boots from a secondary storage device, commands the disk drive to collect performance data for the HSA, and then second boots from the HSA.

DETAILED DESCRIPTION OF EMBODIMENTS OF THE INVENTION

Figure 2A:
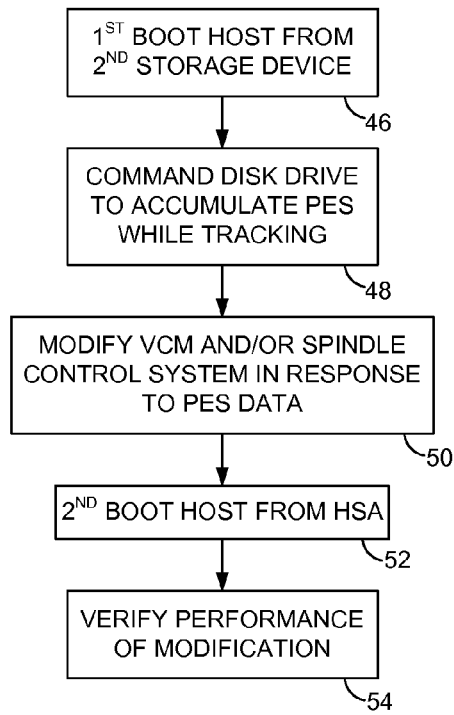
FIG. 2A is a flow diagram according to an embodiment of the present invention wherein at least one of a VCM and spindle motor control system is modified in response to accumulated performance data (PES data in this embodiment).

FIGS. 1A and 1B shows a computer system 2 according to an embodiment of the present invention comprising a disk drive 4 comprising a head stack assembly (HSA), the HSA comprising a spindle motor 6 for rotating at least one disk $8_1$, and at least one head $10_1$ actuated over the disk $8_1$. The computer system 2 further comprises a host 12 coupled to the disk drive 4, wherein the host 12 comprises a microprocessor 14 operable to execute the flow diagram of FIG. 1C. The microprocessor first boots the host by reading boot data from a secondary storage device (step 16). After first booting the host, the microprocessor commands the disk drive to accumulate performance data for the HSA (step 18), and after accumulating the performance data, the microprocessor second boots the host by reading boot data from the HSA (step 20).

In one embodiment, the host is booted from a secondary storage device so that the disk drive is able to access the HSA without interruption in order to accumulate the performance data. Otherwise, if the host were booted from the HSA (e.g., booted from operating system files stored on the disks), the accumulation of performance data would be periodically interrupted due to the host accessing the operating system files stored on the disks, wherein the periodic interruptions may degrade the quality of the performance data. Accordingly, in one embodiment the host 12 is modified so that it boots from a secondary storage device, including to periodically access operating system files stored on the secondary storage device, thereby allowing the disk drive to continuously accumulate the performance data for the HSA. Once the disk drive is finished accumulating the performance data, the host is modified in order to boot normally from the HSA. For example, the host may comprise a personal computer (PC) or a laptop computer having operating system files stored on the disks of a disk drive. The host would normally boot by reading the operating system files from the disks, but the host is modified in the embodiments of the present invention in order to boot by reading operating system files from a secondary storage device, thereby enabling the disk drive to access the HSA without interruption in order to accumulate the performance data.

In the embodiments of the present invention the host may boot from any suitable secondary storage device instead of from the HSA. FIG. 1A shows various example secondary storage devices according to different embodiments. For example, the secondary storage device may comprise a Universal Serial Bus (USB) device 22 (e.g., a thumb drive) that is plugged into a USB port of the host. The USB device 22 comprises boot data (e.g., operating system files) that may be the same or different from the boot data stored on the disks of the HSA. For example, the disks of the HSA may store a Windows operating system, whereas the USB device 22 may store a different operating system, such as a Linux operating system. After plugging the USB device 22 into the host 12, a user may configure the host to boot from the USB device 22, for example, using a control dialog or by pressing a dedicated key during a reboot which forces the host to boot from the USB device 22.

In another embodiment, the secondary storage device may comprise a network attached storage device (NASD) 24 coupled to the host via any suitable network 26 (LAN or WAN such as the Internet) through any suitable port 28 (e.g., a wired or wireless port). The NASD 24 may be a stand-alone device coupled to the host via the network 26, or the NASD 24 may comprise a storage device (e.g., a disk drive) within a server coupled to the host via the network 26. A user may configure the host to boot from the NASD 24, for example, using a control dialog or by pressing a dedicated key during a reboot which forces the host to boot from the NASD 24.

FIG. 1A shows yet another embodiment of the present invention wherein the secondary storage device may comprise a non-volatile semiconductor memory (NVSM) 30, such as a suitable flash memory, incorporated within the disk drive 4. Normally the NVSM 30 may be used to implement typical operations of a hybrid drive, such as implementing a write cache or a read cache. In an embodiment of the present invention, the host commands the disk drive to relocate the host operating system from the disks 8 to the NVSM 30, thereby configuring the control circuitry 32 within the disk drive to provide the boot data from the NVSM 30 rather than from the disk 8 during the next boot of the host. When the disk drive is finished accumulating the performance data, the host commands the disk drive to relocate the host operating system back to the disks 8 so that during the next boot of the host the operating system is read from the disks 8. Accordingly, in this embodiment the host may still boot from the disk drive while still enabling the performance data for the HSA to be accumulated continuously.

In the embodiment of FIG. 1A, the disk $8_1$ comprises embedded servo sectors $34_1$-$34_N$ that define a plurality of tracks 36. The control circuitry 32 processes a read signal 38 emanating from the head $10_1$ to demodulate the servo sectors $34_1$-$34_N$ and generate a position error signal (PES) representing an error between the actual position of the head and a target position relative to a target track. The control circuitry 32 filters the PES using a suitable compensation filter to generate a control signal 40 applied to a voice coil motor (VCM) 42 which rotates an actuator arm 44 about a pivot in order to actuate the head $10_1$ radially over the disk in a direction that reduces the PES. The servo sectors $34_1$-$34_N$ may comprise any suitable position information, such as a track address for coarse positioning and servo bursts for fine positioning.

In one embodiment, the performance data accumulated by the disk drive after booting the host from the secondary storage device relates to a control system operable to actuate the head over the disk. For example, the performance data may comprise the PES generated from reading the servo bursts while maintaining the head over a target track. In another embodiment, the performance data accumulated by the disk drive after booting the host from the secondary storage device relates to a control system operable to control the spindle motor. For example, in one embodiment while maintaining the head over a target track the PES and/or fly height of the head may be accumulated relative to the rotation speed of the disk. This embodiment may be used to evaluate various aspects of the spindle motor that are reflected in the performance data, such as vibrations, wobble, runout, windage, resonances, etc.

FIG. 2A is a flow diagram according to an embodiment of the present invention wherein the host is first booted from a secondary storage device (step 46) and then commands the disk drive to accumulate the PES data while maintaining the head over a target track (step 48). The accumulated PES data is then evaluated in order to modify at least one of the control system for controlling the VCM or the spindle motor (step 50). For example, a servo compensator algorithm for either control system may be modified, a fly height of the head may be modified, a rotation speed of the disk may be modified, etc. After modifying at least one of the control systems, the host is booted from the HSA (step 52) so that the modification can be verified by operating the disk drive from the host (step 54). For example, the host may execute a sequence of access commands that simulate normal operating conditions in order to verify the performance of the disk drive after the modification.

Figure 2B:
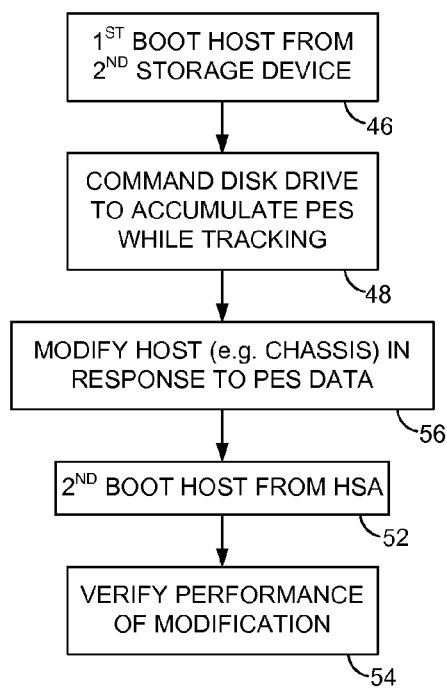
FIG. 2B is a flow diagram according to an embodiment of the present invention wherein the host is modified (e.g., the chassis) in response to accumulated PES data.

FIG. 2B is a flow diagram according to an embodiment of the present invention wherein after accumulating the PES data (step 48), the accumulated PES data is evaluated in order to modify the host (step 56). For example, the chassis of a PC or laptop may be modified in order to dampen vibrations propagating to the disk drive. After modifying the host, the host is booted from the HSA (step 52) in order to verify the modification as described above. In one embodiment, the process of modifying the disk drive or the host in response to the accumulated performance data may be iterated in order to optimize one or more components or control systems.

Figure 3:
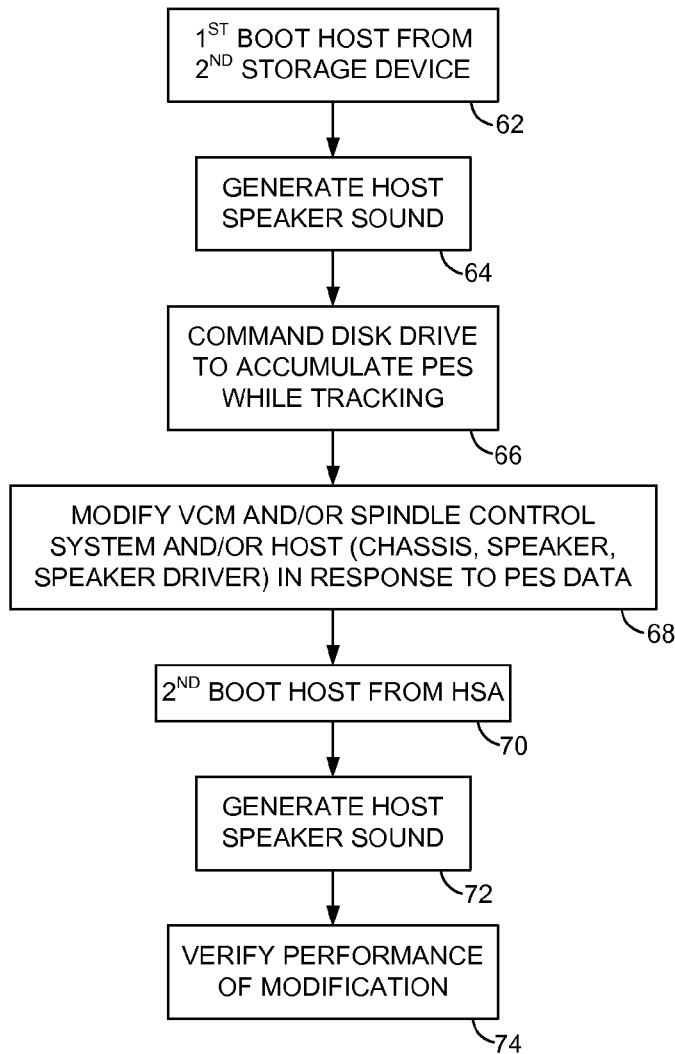
FIG. 3 is a flow diagram according to an embodiment of the present invention wherein the host generates speaker sound to perturb the disk drive while accumulating the performance data.
Figure 4:
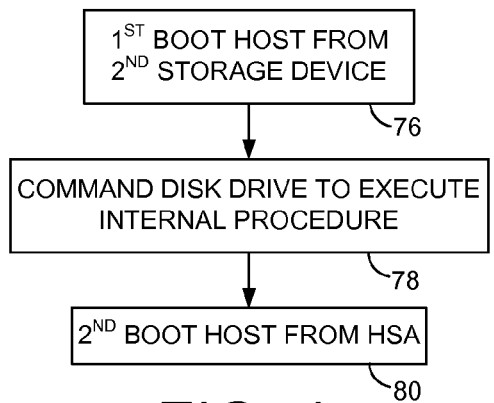
FIG. 4 is a flow diagram according to an embodiment of the present invention wherein the host commands the disk drive to execute an internal procedure while accumulating the performance data.

In one embodiment illustrated in FIG. 1A, the host 12 may comprise a speaker 58 and a speaker driver 60 for generating speaker sound that may affect the operation of the disk drive 4. Accordingly, in one embodiment the host 12 generates speaker sound while the disk drive is accumulating the performance data so that the affect of the speaker sound on the performance of the disk drive can be evaluated. This embodiment is understood with reference to the flow diagram of FIG. 3 wherein after booting the host from the secondary storage device (step 62) the host generates speaker sound (step 64). Any suitable speaker sound may be generated, such as a single frequency or white noise or any other suitable sound pattern. In addition, the host may adjust an amplitude of the speaker sound instead of, or in addition to, the frequency in order to evaluate the resulting affect on the performance data.

After accumulating the performance data (such as accumulating the PES while tracking a target track (step 66)), at least one of the VCM or spindle motor control system, or the host, is modified in response to the accumulated PES data (step 68). In one embodiment, the host speaker 58 and or the speaker driver 60 may be modified (hardware or software) in response to the accumulated PES data. In another embodiment, the host chassis and/or the disk drive mounting brackets may be modified to attenuate the affect of the speaker sound on the disk drive. The host is then booted from the HSA (step 70) and while again generating the speaker sound (step 72) the modification is verified as described above (step 74).

The disk drive may perform any suitable operation while accumulating the performance data after the host has been booted from the secondary storage device. In one embodiment, the disk drive may execute any suitable internal procedure, such as any suitable manufacturing procedure or maintenance procedure. For example, various servo parameters may be calibrated for the VCM servo controller, such as calibrating seek and settle parameters. In another embodiment, the disk drive may map the surface of the disk so that corresponding dynamic fly height parameters may be calibrated. In yet another embodiment, the disk drive may execute a defect scan of the disks in order to relocate defective data sectors to spare data sectors. In still another embodiment, the disk drive may perform a refresh operation on the recorded data by reading and rewriting the data, or the disk drive may perform a garbage collection operation when implementing dynamic logical block address (LBA) mapping (logged structured writing) wherein write commands are performed at the head of a circular buffer on the disk. The embodiments of the present invention facilitate the internal procedures by enabling the disk drive to access the disks without interruption from the host which has been booted from the secondary storage device. Once the disk drive completes the internal procedure(s), the host may be rebooted from the disks of the disk drive and resume normal operation.

In one embodiment, the host microprocessor 14 shown in FIG. 1A as well as the control circuitry 32 within the disk drive 4 may execute code segments of a computer program in order to perform at least some of the steps shown in the above described flow diagrams. The code segments of the computer program may be stored on any suitable computer readable storage medium, such as a suitable disk storage medium (magnetic or optical), or a suitable semiconductor storage medium (e.g., a volatile random access memory or a non-volatile flash memory). In yet another embodiment, the code segments of the computer program may be stored remotely and accessed by the host 12 over a network such as the Internet.

What is claimed is:

1. A method of evaluating a head stack assembly (HSA) of a disk drive, the HSA comprising a spindle motor for rotating at least one disk and at least one head actuated over the disk, the method comprising:
   first booting a host by reading boot data from a secondary storage device;
   after first booting the host, commanding the disk drive to accumulate performance data for the HSA and accumulating performance data for the HSA uninterrupted by the host; and
   after accumulating the performance data, second booting the host by reading boot data from the HSA.

2. The method as recited in claim 1, wherein the performance data relates to a control system operable to actuate the head over the disk.

3. The method as recited in claim 2, wherein the performance data comprises a position error signal (PES) for the head.

4. The method as recited in claim 2, further comprising modifying the control system in response to the accumulated performance data.

5. The method as recited in claim 1, wherein the performance data relates to a control system operable to control the spindle motor.

6. The method as recited in claim 5, wherein the performance data comprises at least one of a position error signal (PES) and a fly height for the head.

7. The method as recited in claim 5, further comprising modifying the control system in response to the accumulated performance data.

8. The method as recited in claim 1, further comprising modifying the host in response to the performance data.

9. The method as recited in claim 8, further comprising modifying a chassis of the host.

10. The method as recited in claim 8, further comprising modifying a speaker of the host.

11. The method as recited in claim 8, further comprising modifying a speaker driver of the host.

12. The method as recited in claim 1, further comprising generating host speaker sound while accumulating the performance data.

13. The method as recited in claim 1, further comprising actuating the head over a track on the disk while accumulating the performance data.

14. The method as recited in claim 1, further comprising executing an internal procedure for the HSA while accumulating the performance data.

15. A computer system comprising:
   a disk drive comprising a head stack assembly (HSA), the HSA comprising:
      spindle motor for rotating at least one disk; and
      at least one head actuated over the disk; and
   a host coupled to the disk drive, the host comprising a microprocessor operable to:
      first boot the host by reading boot data from a secondary storage device;
      after first booting the host, command the disk drive to accumulate performance data for the HSA uninterrupted by the host; and
      after accumulating the performance data, second boot the host by reading boot data from the HSA.

16. The computer system as recited in claim 15, wherein the performance data relates to a control system operable to actuate the head over the disk.

17. The computer system as recited in claim 16, wherein the performance data comprises a position error signal (PES) for the head.

18. The computer system as recited in claim 15, wherein the performance data relates to a control system operable to control the spindle motor.

19. The computer system as recited in claim 18, wherein the performance data comprises at least one of a position error signal (PES) and a fly height for the head.

20. The computer system as recited in claim 15, wherein the microprocessor is further operable to generate speaker sound while the disk drive is accumulating the performance data.

21. The computer system as recited in claim 15, wherein the microprocessor is further operable to command the disk drive to actuate the head over a track on the disk while accumulating the performance data.

22. The computer system as recited in claim 15, wherein the microprocessor is further operable to command the disk drive to execute an internal procedure for the HSA while accumulating the performance data.

* * * * *